Sept. 28, 1926.
R. A. SMITH
RADIATOR FOR MOTOR VEHICLES
Filed June 10, 1925      2 Sheets-Sheet 1
1,601,226
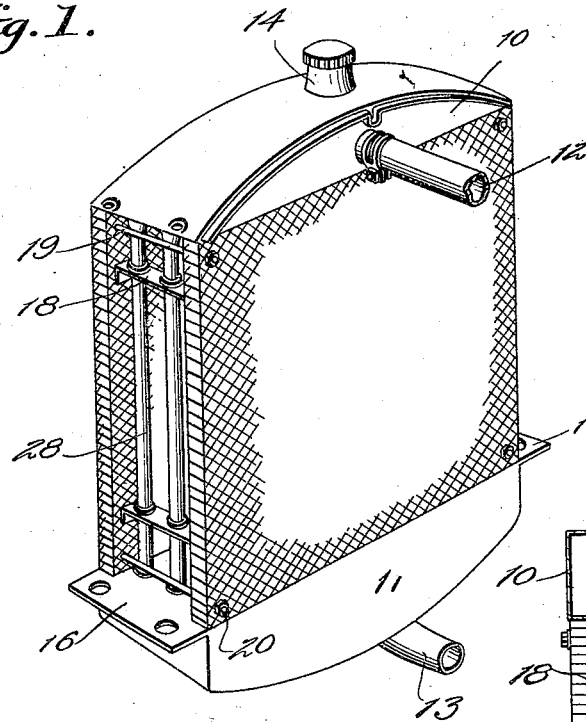
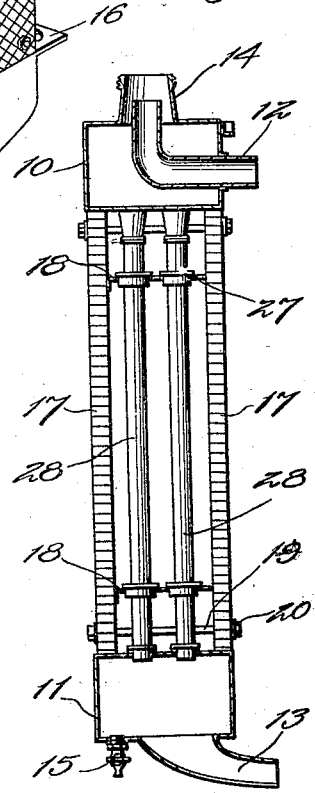
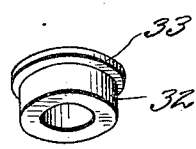
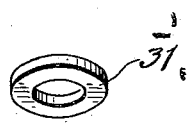
R. A. Smith
INVENTOR
BY *Victor J. Evans*
ATTORNEY
WITNESS:

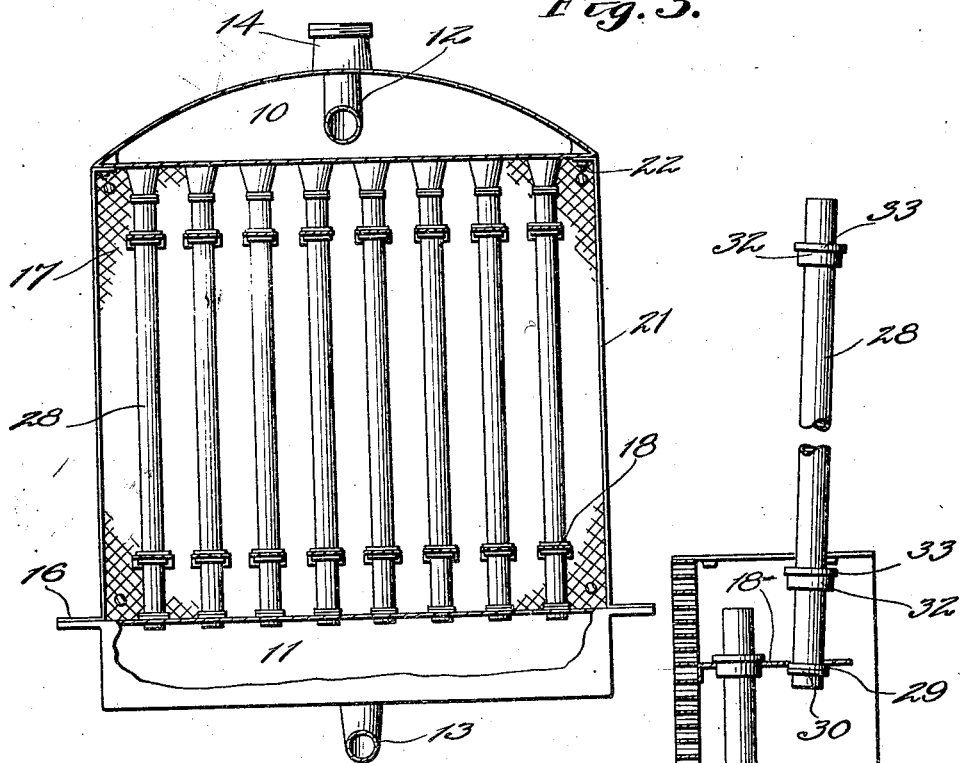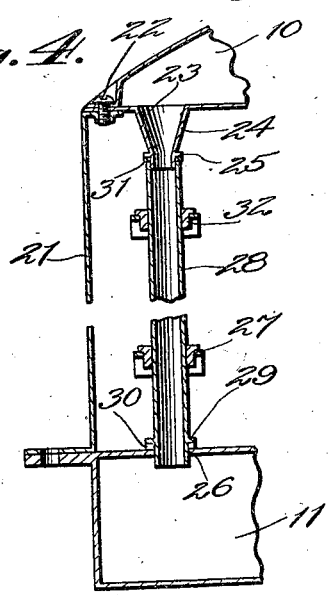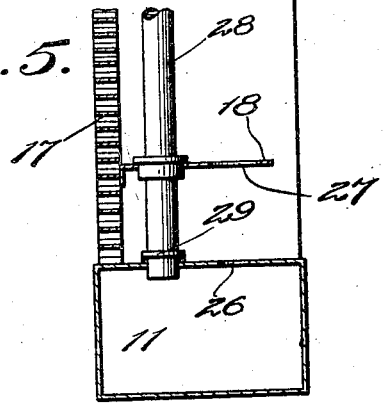

Patented Sept. 28, 1926.

1,601,226

UNITED STATES PATENT OFFICE.

RUSSELL A. SMITH, OF PORT HURON, MICHIGAN.

RADIATOR FOR MOTOR VEHICLES.

Application filed June 10, 1925. Serial No. 36,189.

This invention relates to radiators used in connection with automobile engines and has for its object the provision of a novel radiator of sectional construction so arranged and embodying such details of design that the various portions or sections may be readily disconnected when necessary to permit repairing, it being possible to effect disassembling and reassembling without any particular degree of skill, the device being consequently capable of being repaired by the owner or driver instead of requiring the services of a skilled mechanic.

An important object is the provision of a radiator of this character so constructed and arranged that in case any of the tubes break as the result of freezing or any other cause such tube or tubes may be easily withdrawn and replaced by new ones or the holes left upon their withdrawal may be temporarily plugged up with stoppers such as corks or the like until a permanent repair can be made.

Another object of the invention is to provide a radiator of such construction that whenever any part or parts thereof need replacement it is not necessary to discard the entire device, the device being therefore much more economical.

An additional object is to provide a radiator which will be simple and inexpensive in manufacture, positive and efficient in action, durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a perspective view of the complete radiator with the shell thereof removed if one is used.

Figure 2 is a vertical cross section.

Figure 3 is a rear elevation with parts broken away and in section.

Figure 4 is a detail vertical section.

Figure 5 is a view somewhat similar to Figure 2 but showing the action involved in removing a tube, and Figures 6 and 7 are detail perspective views of certain of the fittings.

Referring more particularly to the drawings, I have shown the radiator as comprising upper and lower tanks 10 and 11 of the usual sheet metal construction and provided respectively with the inlet tubes 12 and 13 which constitute the connections for attachment to the motor. The upper tank 10 has the usual filling neck 14 and the lower tank is provided with a drain cock 15 as is customary. Projecting laterally from the ends or opposite side of the lower tank 11 are apertured wings or plates 16 of ordinary form provided for the purpose of effecting mounting of the radiator upon the frame bars of a vehicle.

Mounted between the upper and lower tanks are forward and rear sets of vanes or honey-comb structures 17 held in proper spaced relation by means of transversely extending brackets 18 brazed, soldered or otherwise suitably secured in place, the upper ones of which are removable, and transversely extending bolts 19 equipped with suitable clamping nuts 20. The upper tank 10 is held in place upon the enclosing shell 21 of the radiator by means of suitable screws or bolts 22.

The upper tank 10 is provided in its bottom with a plurality of holes 23 surrounded by depending preferably conical or tapered nipples 24 having outstanding flanges 25, and the bottom tank 11 has its top provided with holes 26. Similarly, the transverse members 18 are formed with holes 27.

The means for establishing circulation between the upper and lower tanks comprises a plurality of spaced vertically arranged tubes 28 provided near their lower ends with outwardly extending flanges 29 and adapted to have their lower ends extended through the holes 26 in the top of the bottom tank. These tubes are adapted to be telescopically engaged upon the lower ends of the depending nipple members 24 as clearly indicated in Figure 4. Gaskets 30 and 31 are provided for making tight joints. Obviously, the holes 27 in the transverse members 18 must be larger than the out-standing flanges 29 of the tubes in order that the tubes may be withdrawn through the openings when disassembling of the radiator for repair purposes is desired. For normally filling these extra large holes in the transverse members 18, use is made of suitable bushings 32 which fit upon the tubes and which have out-standing portions or flanges 33 resting upon the transverse members 18.

In the use of the device, it will be seen that in case any of the tubes should break or be otherwise damaged so as to cause leakage, it is a simple matter to effect repairing inasmuch as the bolts or screws 22 may be removed to permit removal of the entire top tank. When this is done it is apparent that all of the tubes 28 are uncovered and readily accessible. The operator may then reach into the space between the members 17 and grasp any desired tube or tubes and by pulling upwardly thereon effect extraction thereof. Owing to the sizes of the holes 27 in the transverse members 18 it is quite apparent that there will be nothing to obstruct removal of the tubes through the lower brackets, and the upper brackets may be removed so that the tubes may be easily taken out and laid aside or replaced by new ones. If no new ones are available the holes left where a tube has been removed may be plugged with corks or the like to make a temporary repair.

From the foregoing description and a study of the drawings, it will be apparent that I have thus provided a very simply constructed, inexpensive and yet highly efficient radiator capable of being repaired in a short time by a person not a skilled mechanic, the device being consequently very economical in its upkeep. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. A sectional radiator comprising upper and lower tanks, front and rear ventilator sections secured between said tanks, transverse members maintaining the ventilator sections in spaced parallel relation, and a plurality of vertically arranged tubes mounted between the tanks for establishing communication therebetween, the tubes being detachably connected with the tanks, certain of said ventilator section securing members being formed with holes through which the tubes extend, the tubes having outstanding flanges thereon for abutting engagement with portions of the tanks, said holes in the transverse members being of sufficient size to permit passage of said outstanding flanges.

2. A sectional radiator comprising upper and lower tanks, front and rear ventilator sections secured between said tanks, transverse members maintaining the ventilator sections in spaced parallel relation, and a plurality of vertically arranged tubes mounted between the tanks for establishing communication therebetween, the tubes being detachably connected with the tanks, certain of said ventilator section securing members being formed with holes through which the tubes extend, the tubes having outstanding flanges thereon for abutting engagement with portions of the tanks, said holes in the transverse members being of sufficient size to permit passage of said outstanding flanges, and filler bushings fitted upon the tubes and engaged within said holes for guiding the tubes and maintaining them in position.

3. A sectional radiator comprising upper and lower tanks, ventilator members secured between the tanks in spaced relation, to each other, transverse bracket members secured to the ventilator members for holding them in spaced relation, the top of the lower tank being provided with holes and the bottom of the upper tank being provided with holes surrounded by depending flanges, and a plurality of vertically arranged tubes having their lower ends telescoped within said holes and their upper ends telescoped onto said depending flanges of the upper tank, outstanding flanges on the tubes, packing gaskets engaged by said flanges for maintaining tight joints and said bracket members having holes for the passage of the tubes and flanges.

In testimony whereof I affix my signature.

RUSSELL A. SMITH.